(12) United States Patent
Motgi et al.

(10) Patent No.: US 10,193,887 B2
(45) Date of Patent: Jan. 29, 2019

(54) NETWORK APPLIANCE

(75) Inventors: Nitin Motgi, Santa Clara, CA (US); Bruno Fernandez-Ruiz, Mountain View, CA (US)

(73) Assignee: OATH INC., New York, NY (US)

(*) Notice: Subject to any disclaimer, the term of this patent is extended or adjusted under 35 U.S.C. 154(b) by 0 days.

(21) Appl. No.: 13/545,099

(22) Filed: Jul. 10, 2012

(65) Prior Publication Data

US 2014/0020065 A1 Jan. 16, 2014

(51) Int. Cl.
*H04L 29/06* (2006.01)

(52) U.S. Cl.
CPC .................. *H04L 63/10* (2013.01)

(58) Field of Classification Search
CPC ......... G06F 19/316; G06Q 50/01; H04L 7/16; H04L 7/20; H04L 7/306; H04L 7/28; H04L 7/2814; H04L 29/06; H04L 29/06557; H04L 29/06598; H04L 29/06605; H04L 29/06625; H04L 63/029; H04L 63/0272; H04L 63/0263; H04L 12/4633; H04L 69/08; H04L 69/18; H04L 69/24
USPC .......................................................... 726/4
See application file for complete search history.

(56) References Cited

U.S. PATENT DOCUMENTS

| | | | |
|---|---|---|---|
| 5,819,271 A * | 10/1998 | Mahoney et al. | |
| 5,983,270 A * | 11/1999 | Abraham | H04L 29/06 709/224 |
| 6,671,818 B1 * | 12/2003 | Mikurak | G06Q 10/06 714/4.21 |
| 6,938,021 B2 * | 8/2005 | Shear | G06Q 20/3674 705/67 |
| 7,630,986 B1 * | 12/2009 | Herz et al. | |
| 7,873,988 B1 * | 1/2011 | Issa et al. | 726/4 |
| 7,886,334 B1 * | 2/2011 | Walsh | G06Q 10/00 713/166 |
| 8,001,013 B2 * | 8/2011 | Serbanescu | G06Q 30/0601 705/26.4 |
| 8,234,346 B2 * | 7/2012 | Rao et al. | 709/207 |

(Continued)

OTHER PUBLICATIONS

Lizard Soft, 'Intranet-Trends-eBook', 2018, LS Intranet by Lizard Soft, entire document, https://ls-intranet.net/wp-content/uploads/Intranet-Trends-eBook-by-LS-Intranet.pdf.*

(Continued)

*Primary Examiner* — Luu T Pham
*Assistant Examiner* — Ronald Baum
(74) *Attorney, Agent, or Firm* — Pillsbury Winthrop Shaw Pittman LLP

(57) ABSTRACT

System, method, and device for providing services on a network. The device comprises a security assessor and a service provider unit. The security assessor is connected to the network and is configured to identify rights of an entity on the network. The service provider unit is connected to the network and the security assessor. The service provider unit comprises a discovery unit, an interaction unit, and an interest unit. The discovery unit identifies content available on the network. The interaction unit identifies interactions of the entity on the network. The interest unit identifies interests of the entity based on the identified interactions and the identified content. The service provider unit provides services to the entity on the network, based on the rights of the entity, and at least one of the identified content and the identified interests of the entity.

18 Claims, 11 Drawing Sheets

(56) References Cited

U.S. PATENT DOCUMENTS

| | | | |
|---|---|---|---|
| 8,296,323 B2* | 10/2012 | Pollard | 707/784 |
| 8,463,795 B2* | 6/2013 | van Hoff | G06F 17/3064 |
| | | | 705/319 |
| 8,539,359 B2* | 9/2013 | Rapaport | G06Q 10/10 |
| | | | 709/217 |
| 8,712,837 B2* | 4/2014 | Flake | G06Q 30/02 |
| | | | 705/14.1 |
| 8,996,648 B2* | 3/2015 | Archambault | H04L 12/588 |
| | | | 709/203 |
| 9,166,806 B2* | 10/2015 | Dean | G06F 17/30699 |
| 2002/0029269 A1* | 3/2002 | McCarty | H04L 63/0815 |
| | | | 709/225 |
| 2003/0079030 A1* | 4/2003 | Cocotis et al. | 709/229 |
| 2003/0229900 A1* | 12/2003 | Reisman | G06F 17/30873 |
| | | | 725/87 |
| 2004/0078340 A1* | 4/2004 | Evans | G06Q 20/10 |
| | | | 705/64 |
| 2004/0172415 A1* | 9/2004 | Messina | G06F 17/30864 |
| 2005/0060584 A1* | 3/2005 | Ginter | H04L 9/3263 |
| | | | 726/4 |
| 2005/0235062 A1* | 10/2005 | Lunt | G06Q 10/10 |
| | | | 709/225 |
| 2006/0155578 A1* | 7/2006 | Eisenberger et al. | 705/2 |
| 2006/0156392 A1* | 7/2006 | Baugher | G06F 21/10 |
| | | | 726/5 |
| 2006/0248573 A1* | 11/2006 | Pannu et al. | 726/1 |
| 2007/0079364 A1* | 4/2007 | Abels | H04L 63/126 |
| | | | 726/10 |
| 2007/0203906 A1* | 8/2007 | Cone | G06F 17/30867 |
| 2007/0260599 A1* | 11/2007 | McGuire et al. | 707/5 |
| 2008/0222295 A1* | 9/2008 | Robinson | G06F 17/30867 |
| | | | 709/227 |
| 2009/0037973 A1* | 2/2009 | Gustave et al. | 726/1 |
| 2009/0063304 A1* | 3/2009 | Meggs | G06Q 10/06 |
| | | | 705/26.62 |
| 2009/0117883 A1* | 5/2009 | Coffing | H04L 12/5895 |
| | | | 455/414.1 |
| 2009/0198506 A1* | 8/2009 | Gupta | G06F 17/30702 |
| | | | 705/1.1 |
| 2010/0030734 A1* | 2/2010 | Chunilal | 707/3 |
| 2010/0070448 A1* | 3/2010 | Omoigui | H01L 27/1463 |
| | | | 706/47 |
| 2010/0081417 A1* | 4/2010 | Hickie | G06F 21/604 |
| | | | 455/414.1 |
| 2010/0174709 A1* | 7/2010 | Hansen | G06F 17/3087 |
| | | | 707/728 |
| 2010/0262550 A1* | 10/2010 | Burritt et al. | 705/319 |
| 2010/0274815 A1* | 10/2010 | Vanasco | 707/798 |
| 2010/0287048 A1* | 11/2010 | Ramer et al. | 705/14.46 |
| 2010/0306249 A1* | 12/2010 | Hill | G06F 17/30867 |
| | | | 707/769 |
| 2011/0112976 A1* | 5/2011 | Ryan et al. | 705/319 |
| 2011/0161130 A1* | 6/2011 | Whalin et al. | 705/7.18 |
| 2011/0161253 A1* | 6/2011 | Ma | G06Q 10/10 |
| | | | 705/500 |
| 2011/0209194 A1* | 8/2011 | Kennedy | 726/1 |
| 2011/0219310 A1* | 9/2011 | Robson | G06Q 10/06 |
| | | | 715/733 |
| 2011/0265148 A1* | 10/2011 | Tam et al. | 726/4 |
| 2011/0276396 A1* | 11/2011 | Rathod | G06F 17/30867 |
| | | | 705/14.49 |
| 2012/0069131 A1* | 3/2012 | Abelow | 348/14.01 |
| 2012/0216296 A1* | 8/2012 | Kidron | 726/28 |
| 2012/0221520 A1* | 8/2012 | Garrett | G06F 17/3089 |
| | | | 707/622 |
| 2012/0259786 A1* | 10/2012 | Cowan, II | 705/310 |
| 2012/0296974 A1* | 11/2012 | Tabe | G06Q 50/01 |
| | | | 709/204 |
| 2012/0331567 A1* | 12/2012 | Shelton | G06F 21/6245 |
| | | | 726/28 |
| 2013/0073366 A1* | 3/2013 | Heath | G06Q 30/0259 |
| | | | 705/14.25 |
| 2013/0073387 A1* | 3/2013 | Heath | 705/14.53 |
| 2013/0275504 A1* | 10/2013 | Patel | G06Q 10/10 |
| | | | 709/204 |
| 2014/0207794 A1* | 7/2014 | Du | H04L 51/32 |
| | | | 707/748 |

OTHER PUBLICATIONS

ClearBox Consulting, 'Intranet Analytics—An independent comparison of leading tools', ClearBox Consulting, Jul. 2016, entire document, https://www.clearbox.co.uk/wp-content/uploads/2016/07/Intranet-analytics-report.pdf.*

* cited by examiner

Search

*User: Head of R&D* — 405

[ Paper ] — 410

Intranet results — 415
Locations of stationery rooms
Maps indication the locations of stationery rooms in ...

Color Printer Policy

Secret self insulating paper - project report — 425

Internet results — 420
Paper - Wikipedia, the free encyclopedia
History|Etymology|Papermaking|ApplicationsPaper is a thin material mainly used for writing upon, printing upon, drawing or for packaging. It is produced by pressing together moist fibers, typically cellulose ...

Paper, envelopes, card stock - including recycled paper ...
Selling paper and envelopes worldwide. 100% Cotton paper, recycled envelopes and various card stock with #10 envelopes. Shimmer metallic paper can deliver a creative ...

Wedding Invitations, Envelopes, Stationery, Crafts
The premier retailer of decorative paper and envelopes, wedding invitations, stationery, stationary paper, crafts, rubber stamps and unique gifts.

NETWORK APPLIANCE

BACKGROUND

1. Technical Field

The present teaching relates to methods, systems, and programming for a network appliance. Particularly, the present teaching is directed to methods, systems, and programming for providing a network appliance that provides services to users of a network.

2. Discussion of Technical Background

Internet service providers such as search engines and social networking sites have invested considerable effort in building sophisticated techniques and services for users. However, the techniques and services developed do not extend to private intranets of for example, large companies. The companies do not wish to allow the above techniques and services into their private networks for reasons of privacy and competitive advantage. This leaves these companies to write and install their own software to provide internally services and techniques readily available on the internet. This process is inefficient and does not produce the high quality results of the commercial service providers on the internet. Allowing the Internet service providers to provide the above services to large companies internally on a network without the privacy and competitive advantage concerns, would allow the Internet service providers a new stream of revenue, and allow the large companies high quality services at reduced cost.

SUMMARY

The teachings disclosed herein relate to methods, systems, and programming for providing services on an intranet. More particularly, the present teaching relates to methods, systems, and programming for providing services on an intranet with maintaining confidentiality and competitive advantage.

In one example, a device for providing services on a network, is disclosed. The device comprises a security assessor and a service provider unit. The security assessor is connected to the network and is configured to identify rights of an entity on the network. The service provider unit is connected to the network and the security assessor. The service provider unit comprises a discovery unit, an interaction unit, and an interest unit. The discovery unit identifies content available on the network. The interaction unit identities interactions of the entity on the network. The interest unit identifies interests of the entity based on the identified interactions and the identified content. The service provider unit provides services to the entity on the network, based on the rights of the entity, and at least one of the identified content and the identified interests of the entity.

In another example, a system for providing services on a network comprising a network appliance, is disclosed. The system comprises a security assessor and a service provider unit. The security assessor is connected to the network and is configured to identify rights of an entity on the network. The service provider unit is connected to the network and the security assessor. The service provider unit comprises a discovery unit, an interaction unit, and an interest unit. The discovery unit identifies content available on the network. The interaction unit identifies activities of the entity on the network. The interest unit identifies interests of the entity based on the identified activities and the content available. The service provider unit provides services to the entities on the network, based on the rights of the entity, and at least one of the identified content and the identified interests of the entity.

In a different example, a method of providing services on a network implemented on a machine having at least one processor, storage, and a communication platform connected to the network, is disclosed. Rights of entities on the network are identified via the communication platform. Content available on the network is identified via the communication platform. Activities of the entities on the network are identified via the communication platform. Interests of the entities are identified based on the identified activities and the content available. Services are provided to the entities on the network, based on the identified rights of the entities, and at least one of the identified content and the identified interests of the entities.

Other concepts relate to software for implementing the network appliance. A software product, in accord with this concept, includes at least one machine-readable non-transitory medium and information carried by the medium. The information carried by the medium may be executable program code and/or data regarding parameters in association with the network appliance operational parameters, such as information related to a configuration etc.

In one example, a machine-readable tangible and non-transitory medium with information recorded thereon, is disclosed. The information, when read by a machine, causes the machine to perform the method steps. The machine identifies rights of entities on a network. The machine identifies content available via the network. The machine records activities of the entities on the network. The machine identifies interests of the entities based on the recorded activities and the content available. The machine provides services to the entities on the network, based on the rights of the entities, and at least one of the identified content and the identified interests of the entities.

Additional advantages and novel features will be set forth in part in the description that follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 depicts another example of search output from an appliance, according to an embodiment of the present teaching;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to a network appliance. As noted above, Internet service providers such as search engines and social networking sites have invested considerable effort in building sophisticated techniques and services for users. However, the techniques and services developed do not extend to private intranets. The companies do not wish to allow the above techniques and services from the Internet into their private networks for reasons of privacy and competitive advantage.

Figure 1:
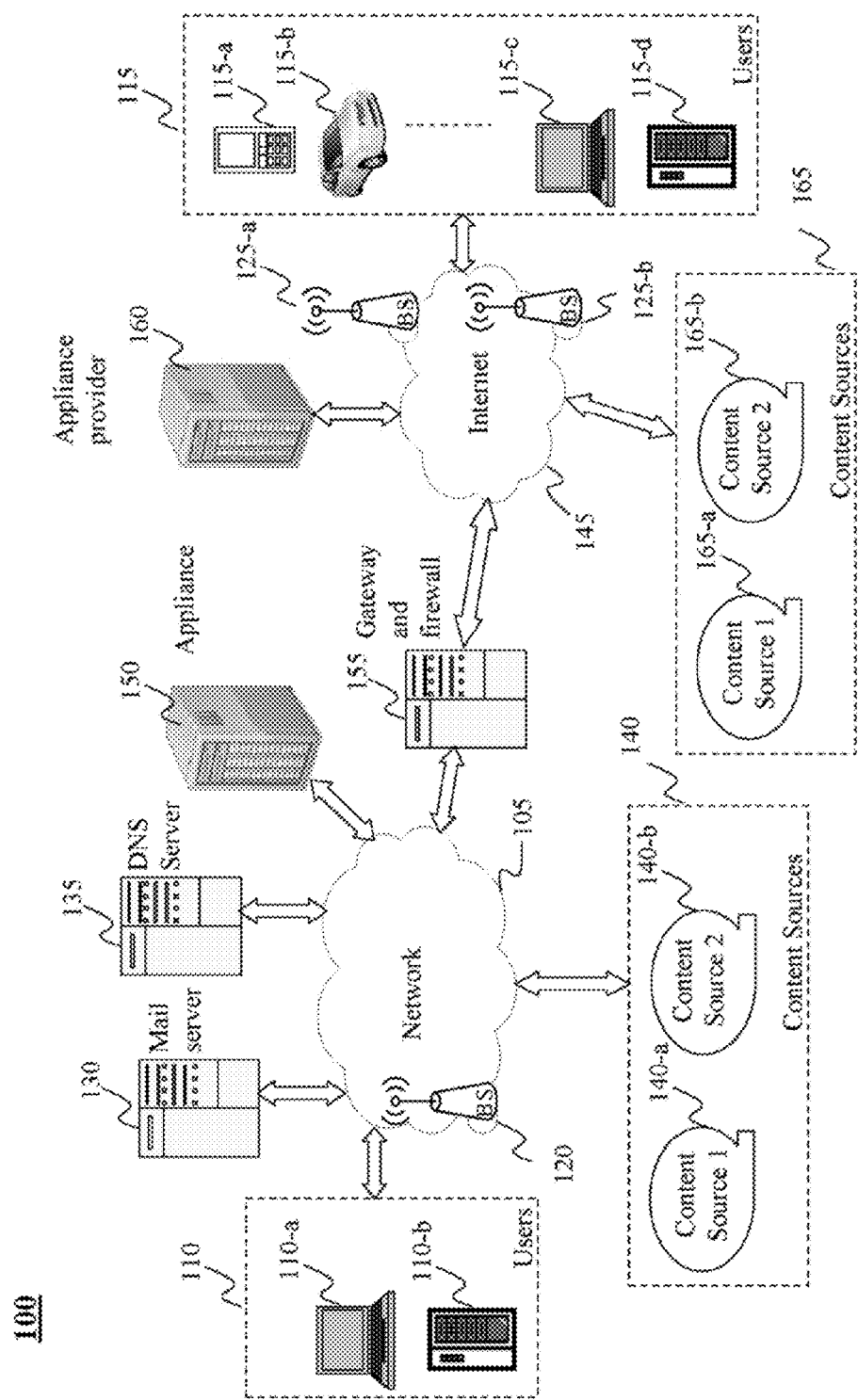
FIG. 1 is a high level depiction of a system including a network appliance, according to an embodiment of the present teaching.

FIG. 1 is a high-level depiction of a system 100 including an appliance 150, according to an embodiment of the present teaching. The system 100 further includes users 110, a network 105, a gateway and firewall 155, a mail server 130, a DNS server 135, and content sources 140. The network 105 in system 100 can be a single network or a combination of different networks. For example, a network can be a local area network (LAN), a wide area network (WAN), a wireless network, a virtual network, or any combination thereof. A network may also include various network access points, wired or wireless access points such as base stations or Internet exchange points 120-a, through which a data source may connect to the network in order to transmit information via, the network.

The gateway and firewall 155, connects the network 105 to the Internet 145. The Internet 145 allows the gateway and firewall to connect with the appliance provider 160, content sources 165, and additional users 115.

Users 110 may be of different types such as users connected to the network via desktop connections (110-b), users connecting to the network via wireless connections such as through a laptop (110-a) A user may send a request to the appliance 150 via the network 105 and receive content related to the request from the appliance 150 through the network 105.

Users 115 may also be connected to the network 105 via, the base stations 125, Internet 145 and gateway and firewall 155. The additional users 115 may be of different types such as users connected to the network via desktop connections (115-d), users connecting to the network via wireless connections such as through a laptop (115-c), a handheld device (115-a), or a built-in device in a motor vehicle (115-b). A user may send a request to the appliance 150 via the network 105 and receive content related to the request from the appliance 150 through the network 105. The additional users 115 may be connected to the network 105 using a virtual private network (VPN).

In some embodiments, the users 110, 115 may correspond to people using a particular device. In some embodiments, the users 110, 115 may correspond to any entity using the network 105. For example, the entities include network crawlers or spiders, applications, groups of users, network and system administrators etc.

The content sources 140 include multiple content sources 140-a, 140-b. A content source may correspond to a web page host, a database, or files in a filing system. The appliance 150 may access information from any of the content sources 140a, 140b and rely on such information to respond to a request from a user.

The content sources 165 include multiple content sources 165-a, 165-b. A content source may correspond to a web page host, a database, or files in a filing system. The appliance 150 may access information from any of the content sources 165a, 165b and rely on such information to respond to a request from a user. In some embodiments, the appliance 150 accesses the content sources 165 via the appliance provider 160.

In some embodiments, the appliance 150 is a stand-alone appliance with all of the hardware and software required to provide services to entities on an intranet. The quality of the services is similar to the quality of internet service providers on the Internet 145. The appliance 150 does not require internet access, or any access outside of the intranet to perform these functions. Thus, the appliance 150 can be deployed on the company intranet without compromising privacy or competitive advantage. The appliance 150 provides services such as, for example, search for documents and files on the network 105, social networking for users 110 and 115, and the ability to automatically target customized content to users 110, 115 based on the content on the intranet and the activities of users 110, 115. The network appliance, for example, can send to a user documents on the intranet that might be of interest and use to the user based on the content and activities of the user. For example, a user might discuss an issue with another user of the intranet over email. The network appliance can identify the subject matter of email and add content to the emails with suggestions of documents and other users that might help resolve the issue.

The network 105 might be an intranet of a company, a government, a university, or any other entity that has an intranet. In some embodiments, the appliance 150 may communicate with the appliance provider 160, via the gateway and firewall 155 and Internet 145.

Figure 2:
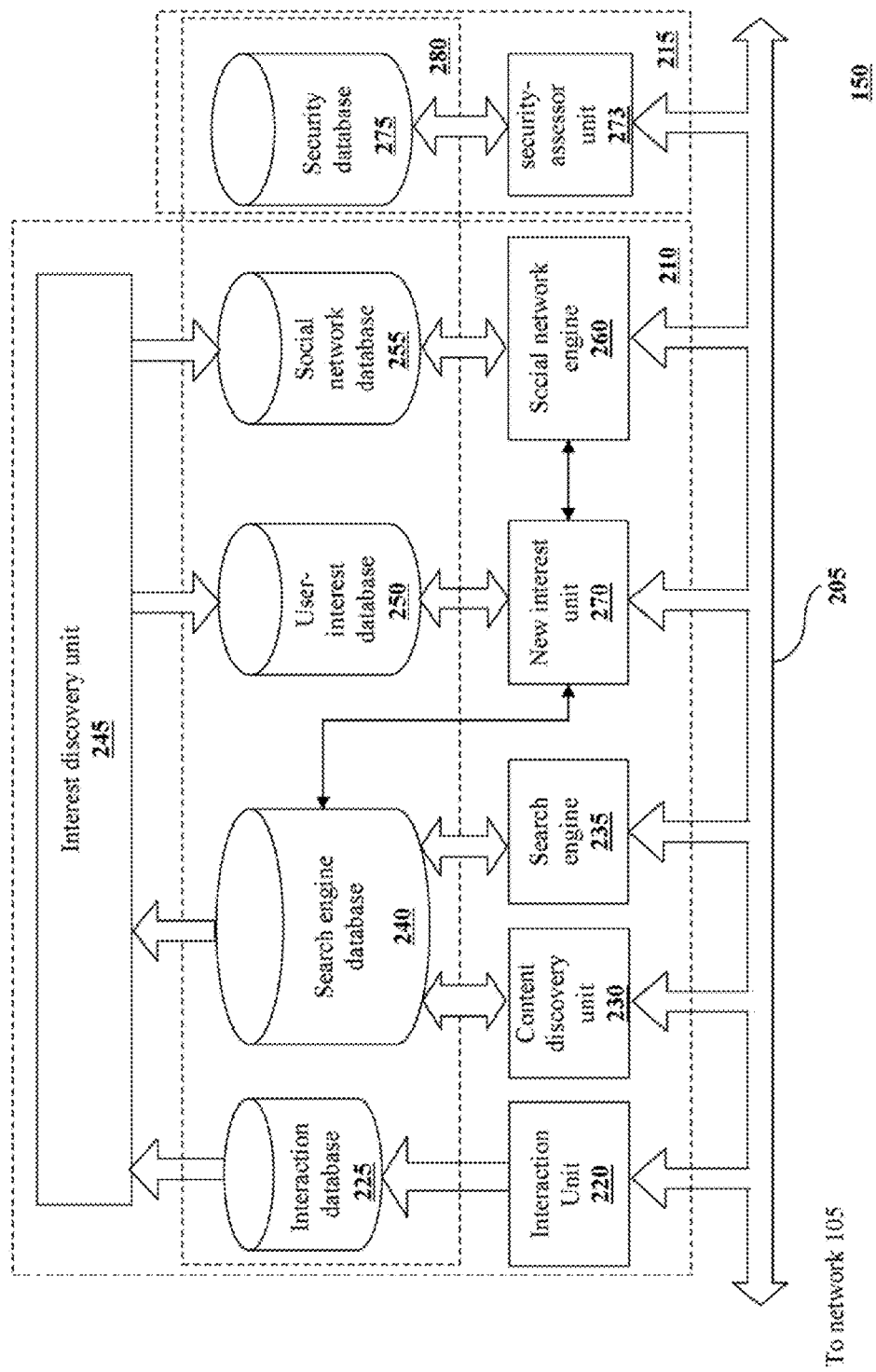
FIG. 2 depicts an appliance, according to an embodiment of the present teaching.

FIG. 2 depicts the appliance 150, according to an embodiment of the present teaching. The appliance 150 comprises a service provider unit 210 and security unit 215.

The service provider unit 210 comprises an interaction, unit 220, an interaction database 225, a content discovery unit 230, a search engine 235, a search engine database 240, an interest discovery unit 245, a user-interest database 250, a new interest unit 270, a social network engine 260, and a social network database 255. The above elements are connected to one another. In some embodiments, one or more of the above elements are connected to one another by a computer network, for example, computer network 205. In some embodiments, one or more of the above elements are connected via a computer bus, or by virtue of being hosted on the same computer hardware. The computer network 205 is connected to the network 105 (FIG. 1).

Interaction unit 220 identifies interactions between entities on the network 105. In some embodiments, the interaction unit 220 identifies the interactions between the users and the service provider unit 210. In some embodiments, the interaction unit 220 identifies interactions between the entities on the network 105 and any other entities on the network 105. In some embodiments, to record interactions on the network 105, additional software is provided to the entities, for example, PC, servers, etc. on the network 105. The additional software ensures that any interactions are sent to interaction unit 220 to be identified. The interaction unit 220 stores the interactions in the interaction database 225.

The content discovery unit 230 searches the network 105 for content. In some embodiments, the content discovery unit 230 includes an intranet spider or intranet crawler. The content discovery unit 230 searches the network systematically for content stored on computers and servers in file systems and databases. The content discovery unit 230 indexes the content identified on the network 105. The content discovery unit 230 stores the index in search engine database 240. The index stored in the search engine database 240 contains locations of the content identified and in some embodiments, keywords, and phrases associated with the content. The search engine database 240 may also store links and references between the identified content. For example, the search engine database 240 may store hyper-links, or any other links for each piece of content. In some embodiments, the search engine database 240 stores complete copies of content identified on the network 105. In some embodiments, the content discovery unit 230 indexes the storage units of personal computers, tablet computers, cell phones, and any other devices connected to the network 105. In some embodiments, the content discovery unit 230 searches devices connected to the network 105 via a VPN connection. For example, the devices of additional users 115, as shown in FIG. 1, may be searched and indexed by the content discovery unit 230.

The Search engine 235 searches for content on the network 105 based on requests by, users, or entities on the network 105. The search engine 235 accesses the search engine database 240 in response to a search request by a user or entity on the network 105. The search engine 235 compares the requested search terms with data in the search engine database 240 to identify relevant content. In some embodiments, if the relevant content is found in the search engine database, the search engine 235 may send a link to the content in the search engine database. If the relevant content is not the search engine database 240, the search engine 235 may send a link to the content on the network 105. In some embodiments, the search engine 200 includes in any response to the search request, a summary of the content, with the link, to the content. In some embodiments, the search engine 235 ranks the identified content, and then sends the identify content listed in ranking order. The search engine 235 may rank the identified content based on, for example, the most recent content, most relevant to the search items, size of document, or the location of the content on the network 105. The location on the network 105 may include, for example, databases, file systems, the internal web pages for the network 105, external web pages that are accessible by users and entities outside of the gateway and firewall 155, backup data, local storage for a PC on the network 105, or storage on a flash memory drive attached to a PC on the network 105, etc. The search engine may further rank the identified content based on the identity of the creator of the content, or any other ranking system independently established by the operator of the network 105. For example, the network operator for the network 105 may rank documents based on importance.

The social network engine 260 provides social networking services such as home pages, instant messaging, email, and links to documents and other users of interest to each user. The above information collected by the social network engine 260 is stored in the social network database 255.

The interest discovery unit 245 identifies the interests of users based on the information stored in the interaction database 225, the search engine database 240, and the social network database 255. The interest discovery unit 245 uses techniques such as latent Dirichlet allocation, hierarchical Dirichlet processes, or probabilistic latent semantic analysis of the stored information, as well as pattern matching techniques, keyword searches, etc. The interests of entities on the network are stored in the user-interest database 250.

The new interest unit 270 identifies new topics of interest for each user as the new topics are identified by the interest discovery unit 245. The new interest unit 270 identifies the new topics based on information in the user-interest database 250 for the corresponding user. When new topics are identified, the new interest unit 270 queries the search engine database for content on the network 105 related to the new topic. The new interest unit 270 also queries the search engine database 240 for new content added to the network 105. If the new interest unit 270 identifies new content, the new interest unit 270 queries the user-interest database 250 to find users interested in the new content added to the network 105. The content identified by the new interest unit 270 for each user is sent to the social network engine 260 along with the identity of the corresponding user. The social network engine stores the identified content, or links to the identified content in the social network database along with data for the corresponding user and in some embodiments a time and date that the content was found. The social network engine incorporates the identified content into the corresponding user's home page, email, or messages at appropriate times, for example, when the user opens their homepage the first time each day. The social network engine also maintains a link, and a web page where a user can select and view a list of identified content that might be of interest.

The security unit 215 comprises a security-assessor unit 273 and a security database 275. The security-assessor unit 273 identifies the rights and privileges of the users on the network 105 and stores the rights and privileges of the users in the security database 275. In some embodiments, the security-assessor unit 273 is capable of searching the network 105 for files corresponding to the security of the network. For example, the security-assessor unit 273 is capable of searching security files on servers and databases to find the rights and privileges of users. In other embodiments, the network administrator indicates the places on the network where security information is located so that the security-assessor unit 273 can access the rights and privileges for the users and store the rights and privileges in the security database 275. In some embodiments, the security-assessor unit 273 does not store rights data in security database 275, instead, the security-assessor unit 273 accesses the security files on the network 105 directly when any request is made. The social network engine 260 and the search engine 235, query the security unit 215 regarding content to be delivered to the user. If the user does not have rights to content, then the content is not delivered to the user.

Figure 3:
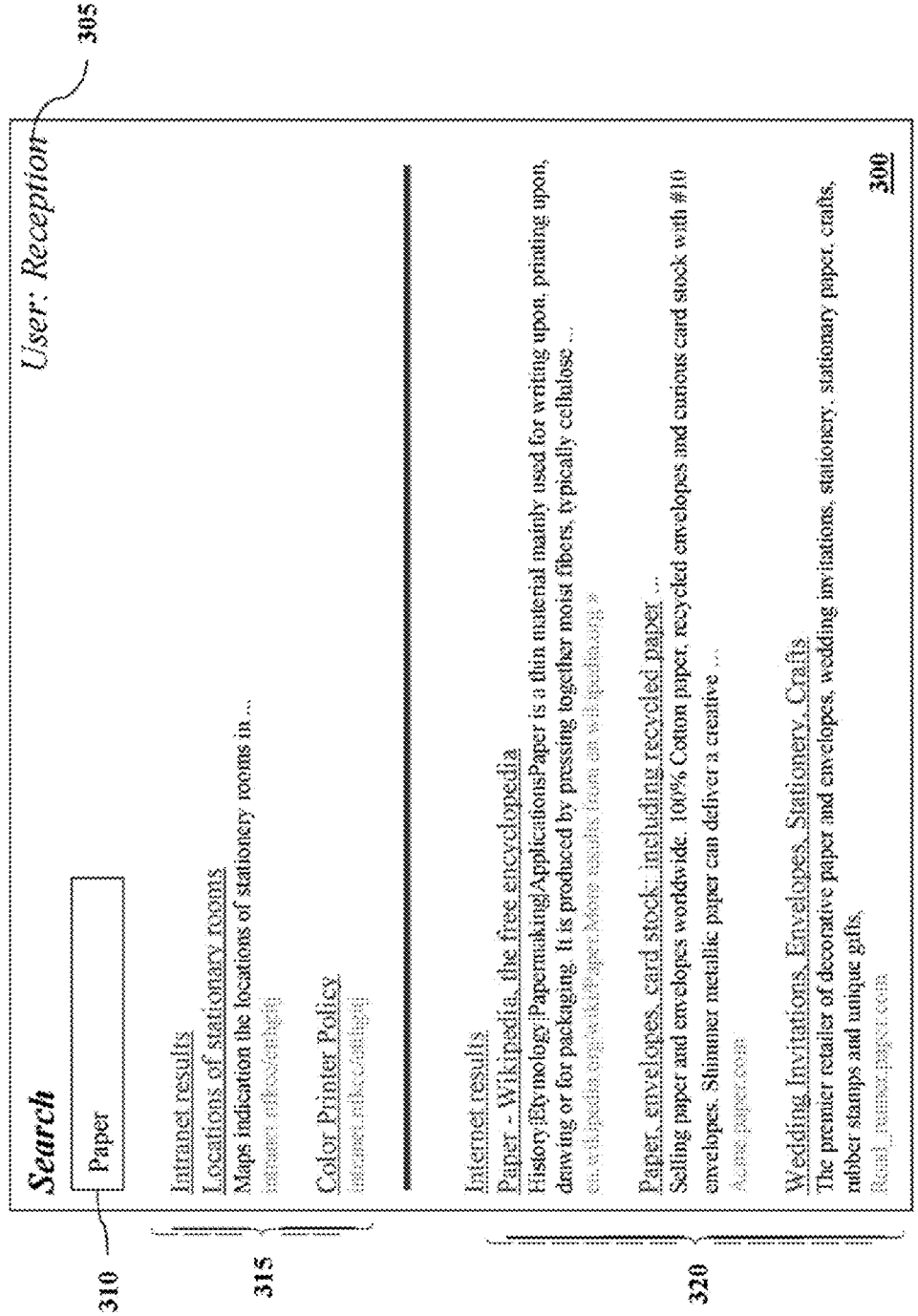
FIG. 3 depicts an example of search output from an appliance, according to an embodiment of the present teaching.

FIG. 3 depicts an example of search output 300 from the appliance 150, according to an embodiment of the present teaching. In this example, the user 305 is indicated as reception. The reception user has initiated a search for "paper" in the search box 310. The search engine 235, has delivered search results 315 for the network 105. In some embodiments, the search engine 235 is able to send a search request to the appliance provider 160 (FIG. 1). The appliance provider performs a search of the Internet 145 and delivers additional search results back to the search engine 235. As shown in FIG. 3, the search engine 235 incorporates the Internet search results 320, as shown in FIG. 3. The reception user receives the results separated so that the reception user can see which content is from the network 105 and which content is from the Internet 145. The search results 315 are filtered for the rights and privileges of the reception user.

FIG. 4 depicts another example of search output 400 from the appliance 150, according to an embodiment of the present teaching. In this example, the user 405 is indicated as the head of R&D. The head of R&D has also initiated a search for "paper" in the search box 410. The search engine has delivered search results 415 for the network 105, and search results 420, for the Internet 145. The head of R&D receives the results separated so that it can be seen which content is on the network 105, and which content is on the Internet 145. The search results 415 are filtered for the rights and privileges of the head of R&D. The search results are similar for the head of R&D and reception. However, the head of R&D is able to view an additional piece of content 425 not available to reception. This piece of content is available to the head of R&D, because the head of R&D has privileges to this piece of content. The reception user does not have privileges to this content.

Figure 5:
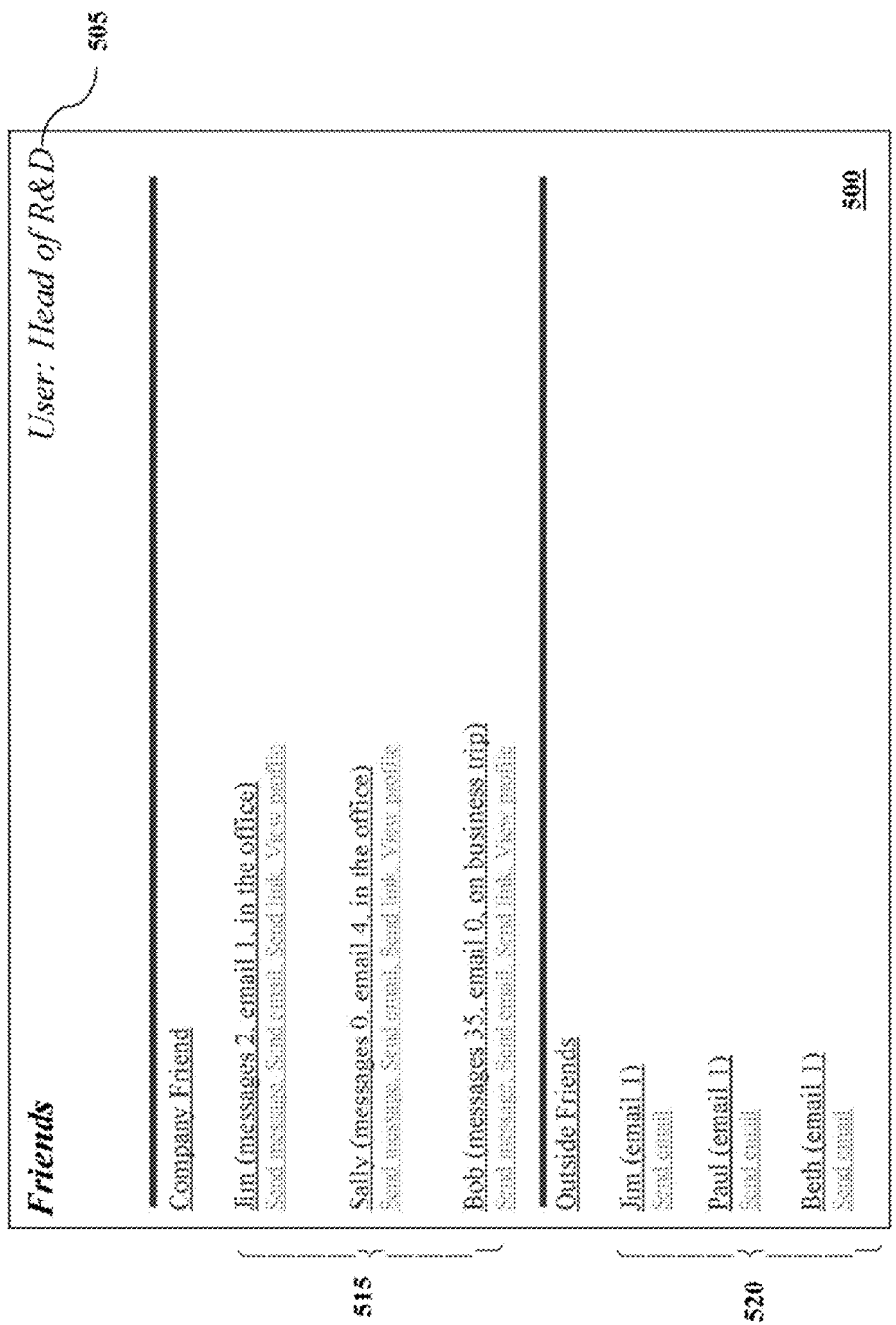
FIG. 5 depicts an example of social network output from an appliance, according to an embodiment of the present teaching.

FIG. 5 depicts an example of social network output 500 from the appliance 150, according to an embodiment of the present teaching. The output 500 shows the friends of the head of R&D. The social network engine 260 separates the friends 515, corresponding to users on the network 105 from friends 520, corresponding to users on the Internet 145. In some embodiments, the social networking engine places requests to the appliance provider 160 to obtain the friends 520 of the head of R&D on the Internet 145. In some embodiments, a friend may occur in both the network 105 and on the Internet 145. For example, Jim appears on the list of friends, both as a friend on the network 105 and a friend on Internet 145. This allows the head of R&D to respond to Jim either for company business or as a social friend from the same page. This makes it easier for the head of R&D to keep company information separate from public information. In some embodiments, the social network engine is capable of filtering messages, e-mail, and content sent, to ensure that company information is not sent out side of the company. Further, the social network engine 260 is capable of filtering messages, e-mail, and content sent between users on the network 105, to ensure that privileged information is not sent to users that do not have privilege for the information. Thus, for example, the head of R&D can e-mail a link to Jim as a user on the Internet 145, if the link is a public webpage on the network 105. However, the head of R&D would not be able to send content on the network 105 that is not visible to users outside of the network 105 to Jim as a user on the Internet 145.

Figure 6:
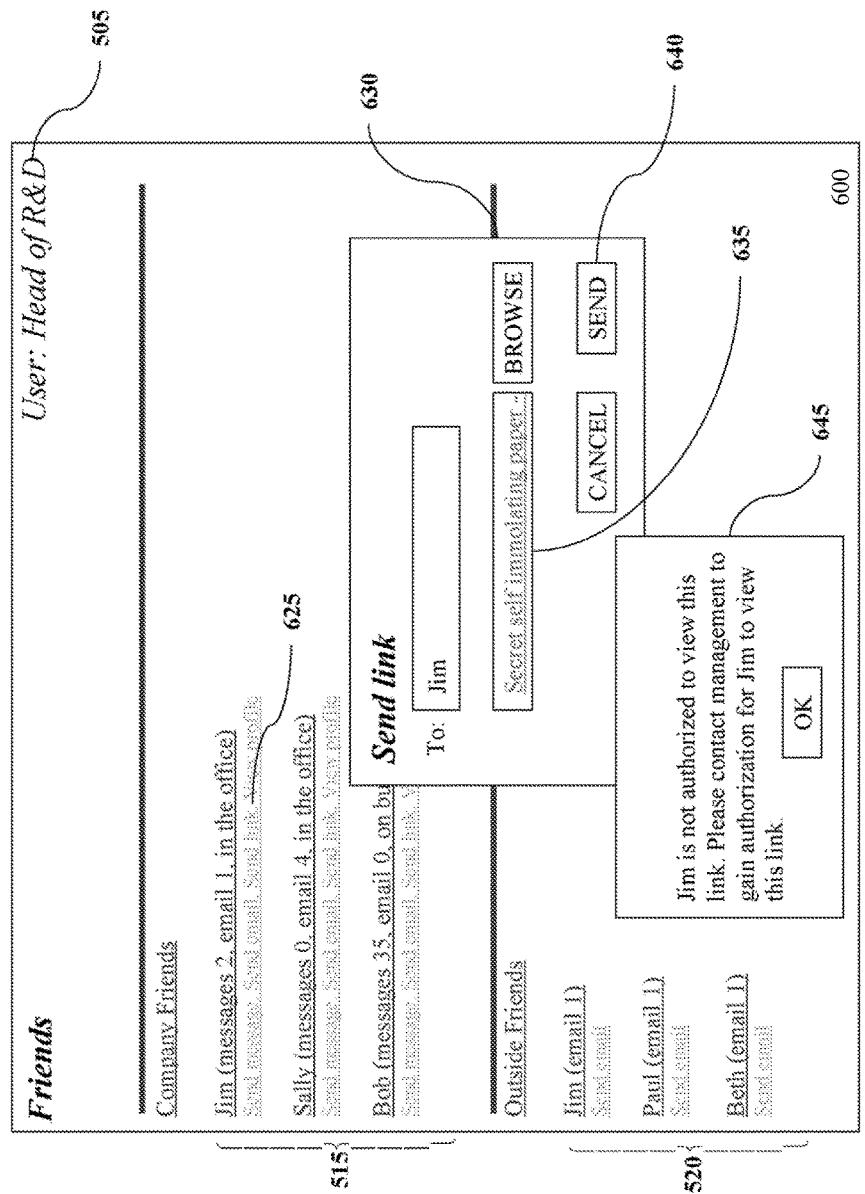
FIG. 6 depicts an example of use of a social network from an appliance, according to an embodiment of the present teaching.

FIG. 6 depicts an example of a use 600 of the social network of the appliance 150, according to an embodiment of the present teaching. In the use 600, the head of R&D clicks on a link 625 to send a link for content to Jim. The social network engine 260, in response to the click opens a pop-up box 630 that allows the head of R&D to browse for the link to the content and send the content to Jim. In this example, the head of R&D has selected a particular document 635. The head of R&D then presses the send button 640. The social network engine 260 sends a request to the security unit 215 requesting whether Jim has privileges to the document 635. In the example of FIG. 6, the security unit 215 indicates that Jim does not have privileges to document 635. Therefore, the social network engine 260 generates a pop-up box 645. The pop-up box 645 indicates that Jim does not have access to the document 635, and that, therefore, the document cannot be sent.

By checking each document with the security unit 215, the social network engine 260, and the search engine 235 ensure that users without privilege do not see documents that they do not have privilege to. Moreover, because users do not see links to documents that they do not have privileges to, those users are not even aware that the document exists, in some embodiments, the social network engine 260 and the search engine 235, provide links to content, on the network 105 to which a user does not have rights or privileges. The user is then prevented from obtaining the link by the security mechanisms external to the appliance 150. In some embodiments, the social network engine 260 and the search engine 235 do not provide the links to the documents to which a user does not have rights or privileges. However, the social network engine 260 and the search engine 235, provide information indicating that useful content exists, and indicate, for example, a person that created the useful content, the manager in charge of the useful content, a department responsible for the useful content, etc. In some embodiments, the social network engine 260 and the search engine 235, provide a link for the useful content that, when clicked sends a message to one of for example, the person that created the useful content, the manager in charge of the useful content, the department responsible for the useful content. The message indicates to the recipient, the user that would like to view the content and the content that the user would like to view. This allows the recipient to decide if the user should be given access to the content. The above mechanism allows, for example, the user to be notified about useful content in a manner that they can request this content without knowing the creator of the content, the owner of the content or the department the content belongs to, unless the relevant party response to the request by the user.

Figure 7:
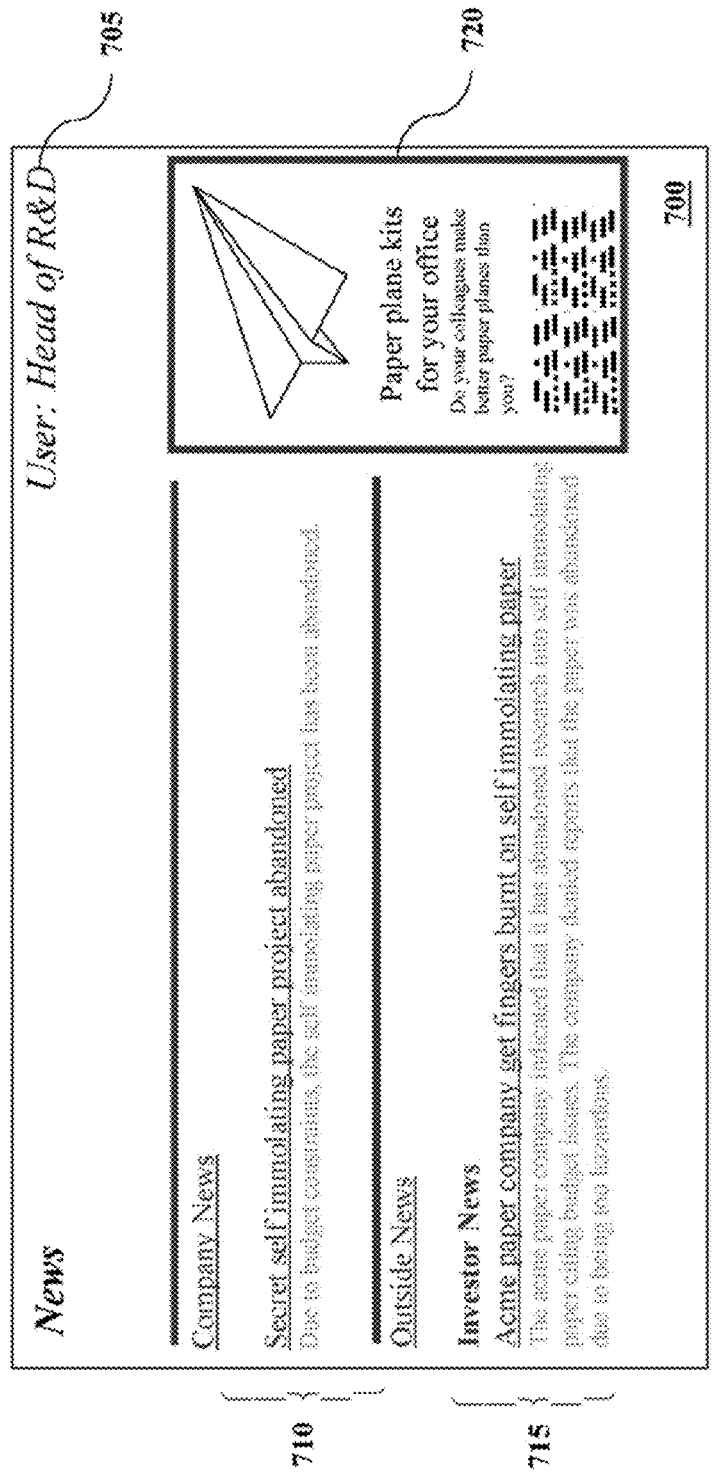
FIG. 7 depicts an example of news output from an appliance, according to an embodiment of the present teaching.

FIG. 7 depicts an example of news output 700 from the appliance 150, according to an embodiment of the present teaching. In the example of output 700, the user, the head of R&D has requested daily news from the social network engine 260. In some embodiments, the news output 700 is a part of the content delivered by the social network engine 260. In some embodiments, the news output 700 may be generated by a different engine, for example, a corporate website. As with the search engine output and the other functions of the social network engine described above, the news items are listed separately for news items 710 on the network 105 and news items 715 on the Internet 145, in some embodiments, the news items 715 on the Internet 145 are obtain by the social network engine 260, requesting news items from appliance provider 160. The social network engine 260 then combines the news items 710 on the network 105 with the news items 715 on the Internet 145 into a single piece of content for the user. The social network engine checks each item of news 710 to verify that the user is privileged to view the item of news 710. If the user is not privileged to view the item of news 710, the item of news will not be displayed to the user. The news output 700 further comprises an advertisement 720. The advertisement 720 is generated based on the user interests stored in the user-interest database 250. In some embodiments, the new interest unit 270 requests advertisements from the appliance provider 160 based on the user interests stored in the user-interest database 250. The owner of the network 105 may be compensated by the appliance provider 160, based on the number of advertisements clicked by users of the network 105. In some embodiments, the advertisements are sent by the appliance provider 160 to the new interest unit 270. The new interest unit 270 then selects the advertisements from among the sent advertisements based on the user interests stored in the user-interest database 250. In some embodiments, the advertisements may be provided by third parties, and the network owner may be compensated based on the number of clicks for the third-party advertisements.

Figure 8:
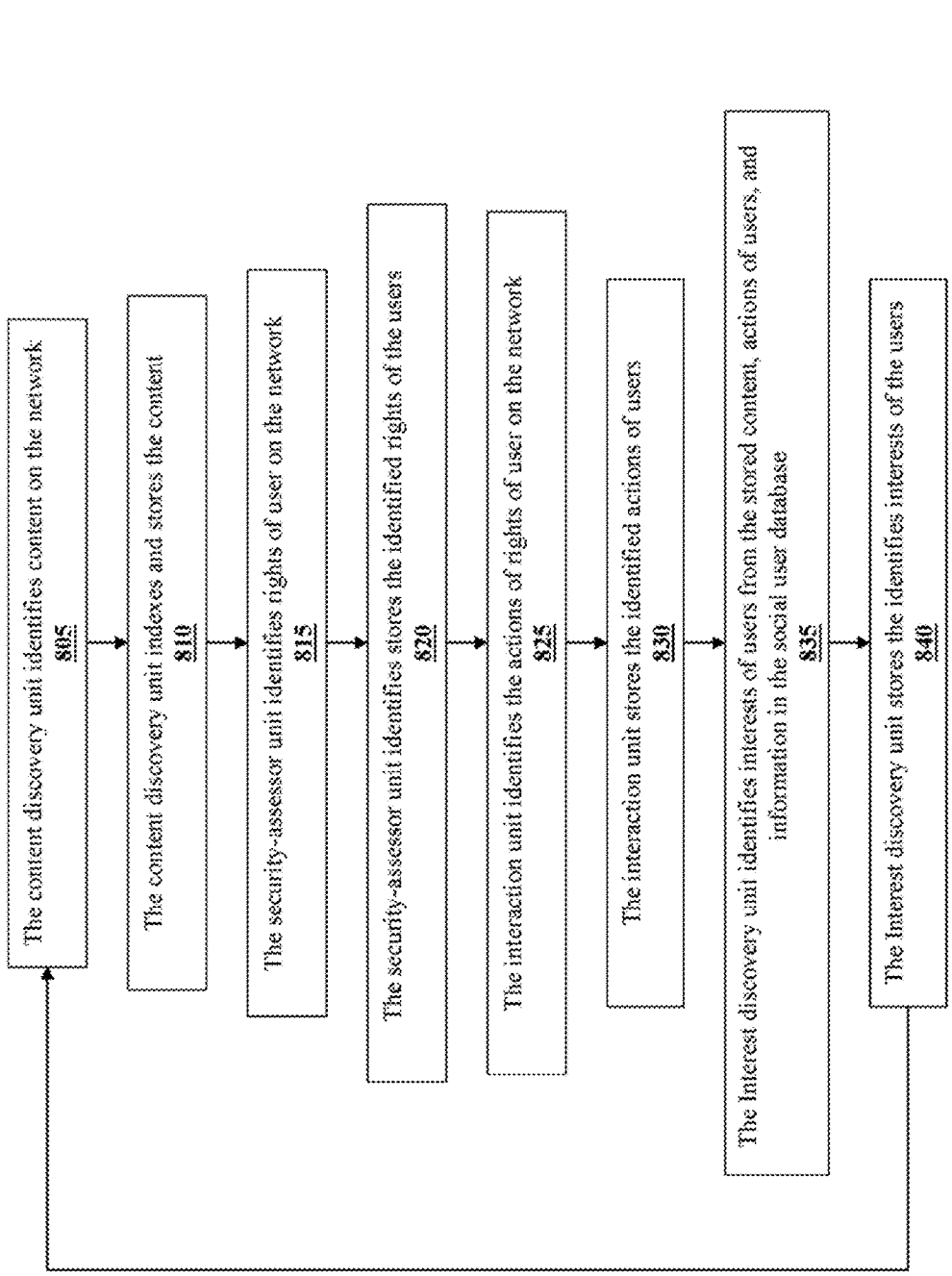
FIG. 8 is a flowchart for a method 800 of identifying interests of a user, according to an embodiment of the present teaching.

FIG. 8 is a flowchart for a method 800 of identifying interests of users, according to an embodiment of the present teaching.

The method begins at step 805. At step 805, the content discovery unit 230 identifies content on the network, for example network 105. In some embodiments, the content discovery unit 230 uses an intranet crawler or spider to discover the content on the network. In some embodiments, the network administrator directs the content discovery unit 230 to the content. When the content discovery is complete the method proceeds to step 810.

At step 810, the content discovery unit 230 indexes and stores the content. The indexing process includes, for example, keyword searches, classification of content by topic discovery, pattern matching etc. When the indexing is complete the method proceeds to step 815.

At step 815, the security-assessor unit 273 identifies rights of entities on the network, in some embodiments, the security-assessor unit 273 uses an intranet crawler or spider to discover the rights of entities on the network. In some embodiments, the network administrator directs the security-assessor unit 273 to the rights of entities. When the rights have been identified the method proceeds to step 820.

At step 820, the security-assessor unit 273 stores the identified rights of the users. When the rights have been stored, the method proceeds to step 825.

At step 825, the interaction unit 220 identifies the actions of users on the network. In some embodiments, the interaction unit 220 identifies the actions of the users with the appliance 150. In some embodiments, machines attached to the network 105 have additional software that directs the actions of the users to the interaction unit 220. When the actions of the users have been identified the method proceeds to step 830.

At step 830, the interaction unit 220 stores the identified actions of users. When the identified actions have been stored, the method proceeds to step 835.

At step 835, the interest discovery unit 245 identifies interests of users from the stored content, actions of users, and information in the social user database The interest discovery process includes, for example, keyword searches, classification of content by topic discovery, pattern matching etc. When the interests of users have been identified, the method proceeds to step 840.

At step 840, the interest discovery unit 245 stores the identified interests of the users. When the interests of the users have been stored, the method repeats from step 805.

In some embodiments, the above steps, 805-840 are performed continuously and in parallel. In some embodiments, the above steps, 805-840 are performed sequentially.

Figure 9:
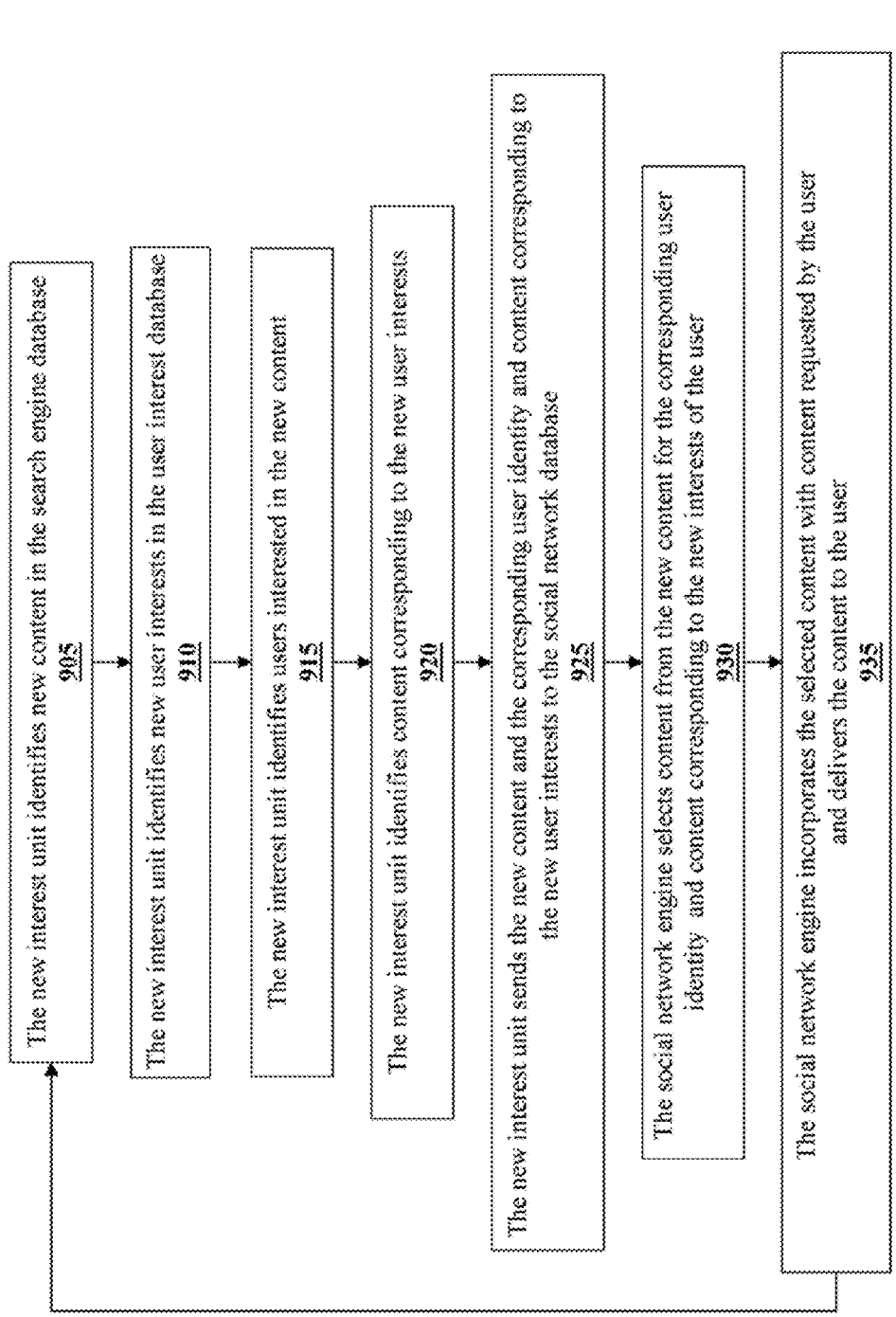
FIG. 9 is a flowchart for a method 900 of providing additional content to users on a network, according to an embodiment of the present teaching.

FIG. 9 is a flowchart for a method 900 of providing additional content to users on the network 105, according to an embodiment of the present teaching.

The method begins at step 905. At step 905, the new interest unit 270 identifies new content in the search engine database. New content corresponds to content found by the content discover unit 230 on the network 105 and stored in the search engine database 240. When the search for new content is complete, the method proceeds to step 910.

At step 910, the new interest unit 270 identifies new user interests in the user interest database. A new user interest corresponds to a user interest recently found by the interest discovery unit 245 and stored in the user-interest database 250. When the search for new user interests is complete, the method proceeds to step 915.

At step 915, the new interest unit 270 identifies users interested in the new content by querying the user interest database 250. When the search for users interested in the new content is complete, the method proceeds to step 920.

At step 920, the new interest unit 270 identifies content corresponding to the new user interests, by querying the search engine database 240 for content on the network 105. When the search for content, corresponding to the new user interests is complete, the method proceeds to step 925.

At step 925, the new interest unit 270 sends the new content and the corresponding user identity, and content corresponding to the new user interests to the social network engine 260. The social network engine 260 stores the new content and the corresponding user identity, and content corresponding to the new user interests in the social network database 255. When the information has been stored by the social network engine 260, the method proceeds to step 930.

In some embodiments, the new interest unit 270 sends the new content and the corresponding user identity, and content corresponding to the new user interests to the search engine 235. The search engine 235 stores the above information. When a search is performed using the search engine 235 by a user on the network, the search engine 235 may provide additional content to the user, based on the above information sent to the search engine 235.

At step 930, the social network engine selects content from the new content for the corresponding user identity and content corresponding to the new interests of the user. The selection may be based on, for example, the time the content was sent by the new interest unit 270, a comparison of the content with recent content requested by or sent to the user, the content of emails of messages sent or received by the user or other users on the network 105. When the content is selected the method proceeds to step 935.

At step 935, the social network engine combines the selected content with content requested by the user and delivers the content to the user. The combined content may be delivered in the form of a webpage, an e-mail, a message, or by any other method compatible with embodiments of the disclosure. When the combined content has been delivered to the user, the method repeats from step 905.

Figure 10:
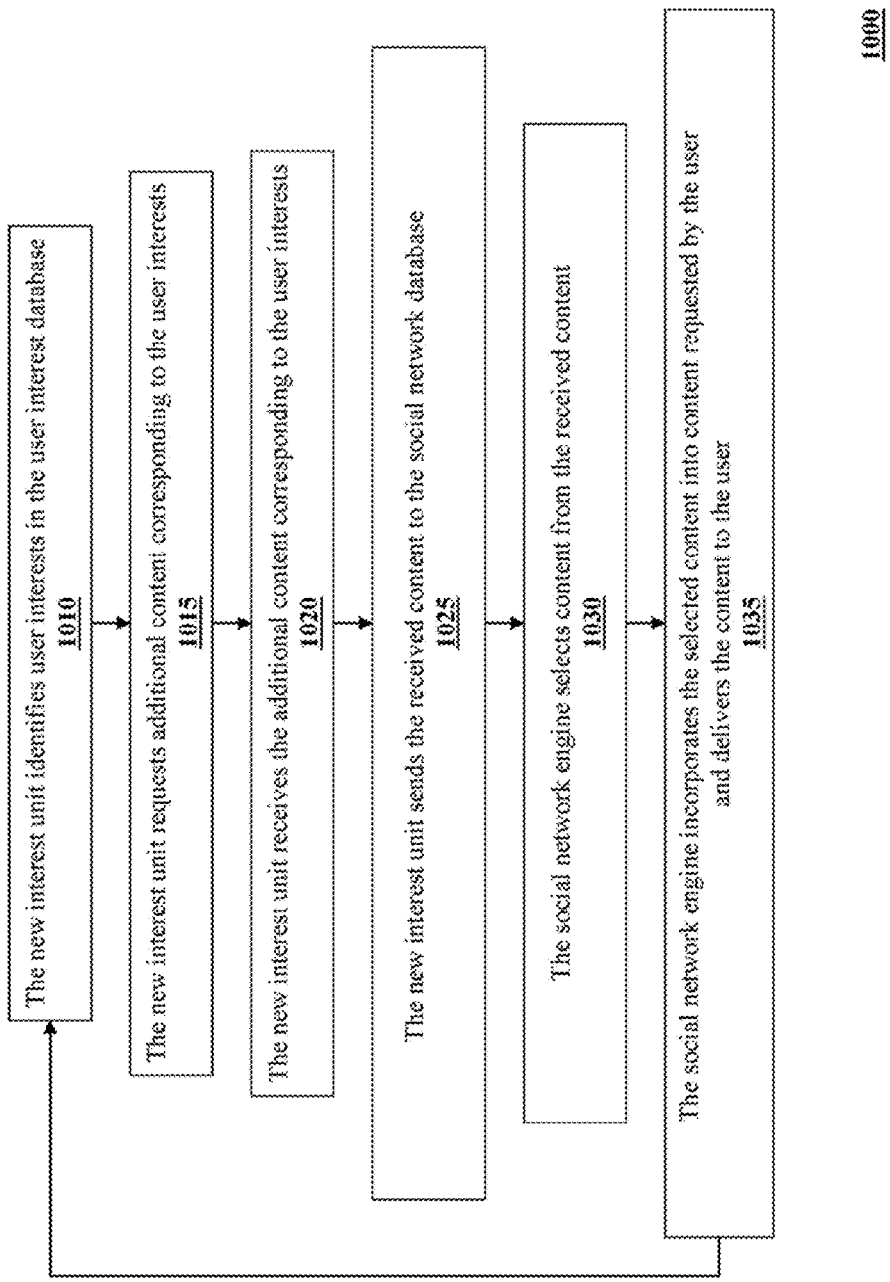
FIG. 10 is a flowchart for a method 1000 of providing additional content to users on a network, according to an embodiment of the present teaching.

FIG. 10 is a flowchart for a method 1000 of providing additional content to users on the network 105, according to an embodiment of the present teaching.

The method begins at step 1010. At step 1010, the new interest unit 270 identifies user interests for a user in the user interest database. When the interests of the user have been identified the method proceeds to step 1015.

At step 1015, the new interest unit 270 requests additional content corresponding to the user interests. In some embodiments, the content may be requested from a server attached to the network 105 that contains information relevant to users of the network 105. For example, the server may contain information regarding company policy. A user using the social network engine 260 or the search engine 235 may view content regarding company policy or discuss company policy in messaging or e-mail. The above interactions are recorded by interaction unit 220 and therefore recorded in user interest database 250 by interest discovery, unit 245. The new interest unit 270 is then able to request content relating to the above company policy from the server. In some embodiments, the new interest unit 270 requests content from the appliance provider 160. The appliance provider 160 may have, for example, an encyclopedia from which to retrieve content related to the user interests. Further, the appliance provider 160 may have, for example, advertising content from which to retrieve content related to the user interests. The new interest unit 270 may request content from a third party on the Internet 145. The third party may be, for example, an advertising agency with advertising content related to the user interests. When the request for additional content is complete the method proceeds to step 1020.

At step 1020, the new interest unit 270 receives the additional content corresponding to the user interests. When the content has been received the method proceeds to step 1025.

At step 1025, the new interest unit 270 sends the received content to the social network engine 260 and the social network engine 260 stores the received content in the social network database 255 for the user. When the received content is stored the method proceeds to step 1030.

At step 1030, the social network engine selects content from the received content. The selection may be based on, for example, the time the content was sent by the new interest unit 270, a comparison of the content with recent content requested by or sent to the user, the content of emails of messages sent or received by the user or other users on the network 105. When the content has been selected the method proceeds to step 1035.

At step 1035, the social network engine combines the selected content into content requested by the user and delivers the content to the user. The combined content may be delivered in the form of a webpage, an e-mail, a message, or by any other method compatible with embodiments of the disclosure. When the combined content has been delivered, the method repeats from step 1010.

Figure 11:
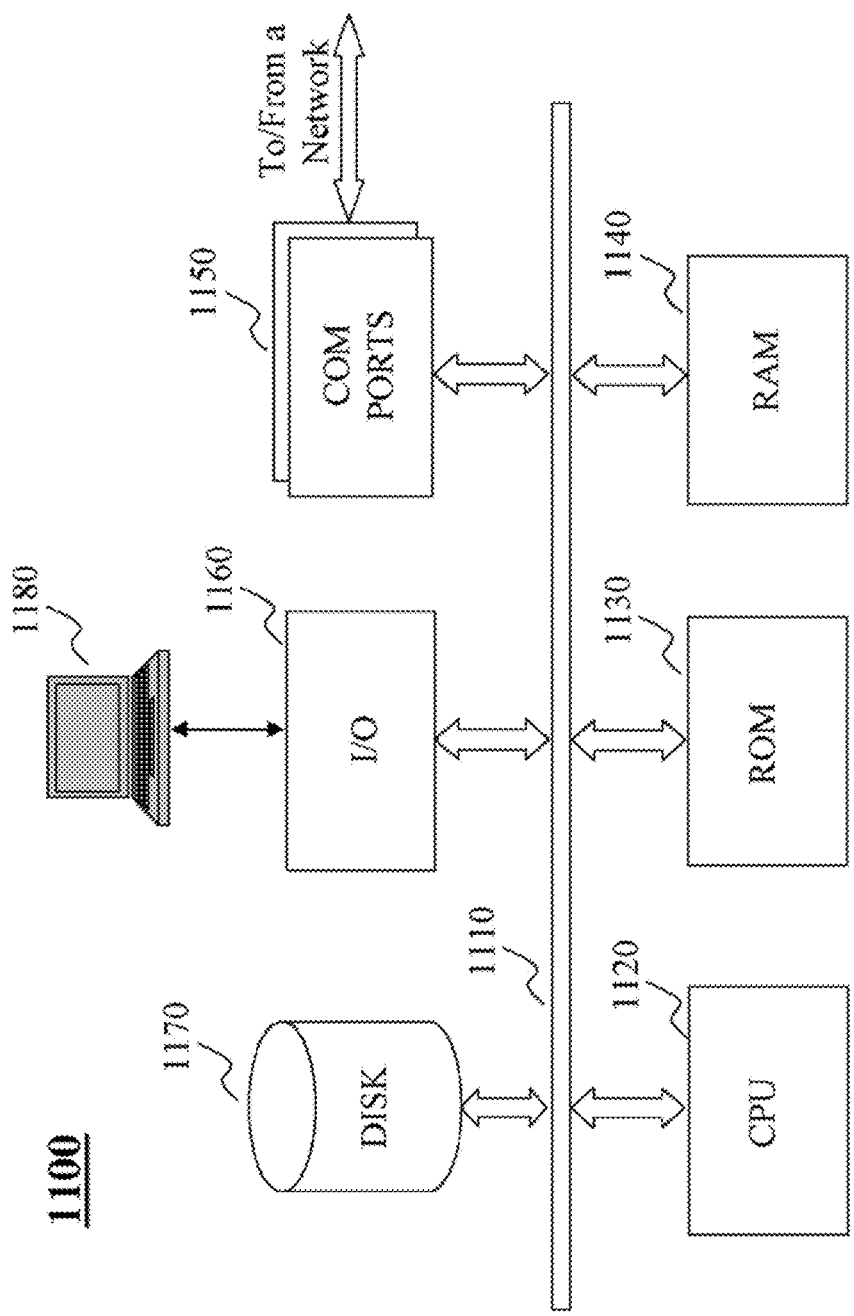
FIG. 11 depicts a general computer architecture on which the present teaching can be implemented.

FIG. 11 depicts a general computer architecture on which the present teaching can be implemented and has a functional block diagram illustration of a computer hardware platform that includes user interface elements. The computer may be a general-purpose computer or a special purpose computer. This computer 1100 can be used to implement any components of the network appliance as described herein. For example, the interaction unit 220, the content discovery unit 230, the search engine 235, the new interest unit 270, the interest discovery unit 245, the social network engine 260, and the security-assessor unit 273 can all be implemented on a computer such as computer 1100, via its hardware, software program, firmware, or a combination thereof. Although only one such computer is shown, for convenience, the computer functions relating to the network appliance may be implemented in a distributed fashion on a number of similar platforms, to distribute the processing load.

The computer 1100, for example, includes COM ports 1150 connected to and from a network connected thereto to facilitate data communications. The computer 1100 also includes a central processing unit (CPU) 1120, in the form of one or more processors, for executing program instructions. The exemplary computer platform includes an internal communication bus 1110, program storage and data storage of different forms, e.g. disk 1170, read only memory (ROM) 1130, or random access memory (RAM) 1140, for various data files to be processed and/or communicated by the computer, as well as possibly program instructions to be executed by the CPU. The computer 1100 also includes an I/O component 1160, supporting input/output flows between the computer and other components therein such as user interface elements 1180. The computer 1100 may also receive programming and data via network communications.

Hence, aspects of the methods of delivering content on an intranet, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of the network appliance. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium, or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory; such as a main memory of such a computer platform. Tangible transmission media include coaxial cables, copper wires, and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media, therefore, include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, network appliance and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

We claim:

1. A device having at least one processor, storage, and a communication platform for providing services, the device comprising:
a security assessor unit implemented on the at least one processor and configured to identify rights of a first entity on an intranet; and
a service provider unit implemented on the at least one processor and connected to the security assessor unit, the service provider unit configured to respond to a first request to provide content to the first entity, the service provider unit comprising:
a discovery unit configured to identify a first piece of information associated with the content that is privileged within the intranet; and
a social network engine configured to determine that the first entity lacks a right to access the content and the first piece of information as defined within the intranet, wherein the content and the first piece of information residing in the intranet are not accessible from outside of the intranet without privileged authentication, wherein:
the service provider unit provides the content to the first entity on the intranet as an intranet private link directed to a corresponding resource that is privileged within the intranet such that access from an external public Internet requires privileged authentication and sends a second request to a second entity to authorize access to the content, wherein the second entity is configured for granting the first entity access to the content responsive to the second request by forwarding a response to the second request to the social network engine to indicate that the first entity has been authenticated to access the content and the first piece of information.

2. The device according to claim 1, wherein the service provider unit is further configured to:
provide the content including a second piece of information to the first entity, wherein the social network engine updates the second piece of information based, at least in part, on interactions between the social network engine and the first entity.

3. The device according to claim 2, wherein:
the first piece of information indicates that the second entity is on the intranet; and
the second piece of information includes a third entity on the external public Internet, wherein the second entity or the third entity corresponds to at least one of: a user that created the content, a user in charge of the content, and a department responsible for the content.

4. The device according to claim 1, wherein the service provider unit further comprises a search engine configured to:
search for the content on the intranet and on the external public Internet responsive to the first request from the first entity;
generate search results; and
return the search results as at least part of the content to be provided to the first entity.

5. A system having at least one processor, storage, and a communication platform for providing services on a network appliance, the system comprising:
a security assessor unit implemented on the at least one processor and configured to identify rights of a first entity on an intranet; and
a service provider unit implemented on the at least one processor and connected to the security assessor unit, the service provider unit configured to respond to a first request to provide content to the first entity, the service provider unit comprising:
a discovery unit configured to identify a first piece of information associated with the content that is privileged within the intranet; and
a social network engine configured to determine that the first entity lacks a right to access the content and the first piece of information as defined within the intranet, wherein the content and the first piece of information residing in the intranet are not accessible from outside of the intranet without privileged authentication, wherein:
the service provider unit provides the content to the first entity on the intranet as an intranet private link directed to a corresponding resource that is privileged within the intranet such that access from an external public Internet requires privileged authentication and sends a second request to a second entity to authorize access to the content, wherein the second entity is configured for granting the first entity access to the content responsive to the second request by forwarding a response to the second request to the social network engine to indicate that the first entity has been authenticated to access the content and the first piece of information.

6. The system according to claim 5, wherein the service provider unit is further configured to:
provide the content including a second piece of information to the first entity, wherein the social network engine updates the second piece of information based, at least in part, on interactions between the social network engine and the first entity.

7. The system according to claim 6, wherein:
the first piece of information indicates that the second entity is on the intranet; and
the second piece of information includes a third entity on the external public Internet, wherein the second entity or the third entity corresponds to at least one of: a user that created the content, a user in charge of the content, and a department responsible for the content.

8. The system according to claim 5, wherein the service provider unit further comprises a search engine configured to:
search for the content on the intranet and on the external public Internet responsive to the first request from the first entity;
generate search results; and
return the search results as at least part of the content to be provided to the first entity.

9. A method of providing services implemented on a machine having at least one processor, storage, and a communication platform connected to a network, the method comprising:
receiving, by the at least one processor, a first request to provide content to a first entity on the intranet;
identifying, by the at least one processor, rights of the first entity on the intranet;
identifying, by the at least one processor, a first piece of information associated with the content that is privileged within the intranet;
determining, by a social network engine, that the first entity lacks a right to access the content and the first piece of information as defined within the intranet, wherein the content and the first piece of information residing in the intranet are not accessible from outside of the intranet without privileged authentication;
providing the content to the first entity on the intranet as an intranet private link directed to a corresponding resource that is privileged within the intranet such that access from an external public Internet requires privileged authentication; and
sending a second request to a second entity to authorize access to the content, wherein the second entity is configured for granting the first entity access to the content responsive to the second request by forwarding a response to the second request to the social network engine to indicate that the first entity has been authenticated to access the content and the first piece of information.

10. The method according to claim 9, wherein the first piece of information indicates that the second entity is on the intranet or a third entity on the external public Internet, wherein the second entity or the third entity corresponds to at least one of: a user that created the content, a user in charge of the content, and a department responsible for the content.

11. The method according to claim 9, further comprising:
searching for the content on the intranet and on the external public Internet responsive to the first request from the first entity;
generating search results; and
returning the search results as at least part of the content to be provided to the first entity.

12. The method according to claim 9, further comprising:
filtering the content based, at least in part, on the rights of the first entity.

13. The method according to claim 9, further comprising:
providing a second piece of information to the first entity on the intranet, wherein the social network engine updates the second piece of information based, at least in part, on interactions between the social network engine and the first entity.

14. The method according to claim 9, further comprising:
identifying activities of the first entity on the intranet; and
identifying interests of the first entity based on the activities, wherein the first piece of information is identified based, at least in part, on the interests.

15. A machine-readable tangible and non-transitory medium with information recorded thereon, wherein the information, when read by a machine, causes the machine to perform the following steps:
receiving, by at least one processor associated with the machine, a first request to provide content to a first entity on the intranet;
identifying, by the at least one processor, rights of the first entity on the intranet;
identifying, by the at least one processor, a first piece of information associated with the content that is privileged within the intranet;
determining, by a social network engine, that the first entity lacks a right to access the content and the first piece of information as defined within the intranet, wherein the content and the first piece of information residing in the intranet are not accessible from outside of the intranet without privileged authentication;
providing the content to the first entity on the intranet as an intranet private link directed to a corresponding resource that is privileged within the intranet such that access from an external public Internet requires privileged authentication; and
sending a second request to a second entity to authorize access to the content, wherein the second entity is configured for granting the first entity access to the content responsive to the second request by forwarding a response to the second request to the social network engine to indicate that the first entity has been authenticated to access the content and the first piece of information.

16. The machine-readable medium according to claim 15, wherein the first piece of information indicates that the second entity is on the intranet or a third entity on the external public Internet, wherein the second entity or the third entity corresponds to at least one of: a user that created the content, a user in charge of the content, and a department responsible for the content.

17. The machine-readable medium according to claim 15, wherein the information, when read by a machine, causes the machine to further perform the following steps:
searching for the content on the intranet and on the external public Internet responsive to the first request from the first entity;
generating search results; and
returning the search results as at least part of the content to be provided to the first entity.

18. The machine-readable medium according to claim 15, further comprising:
filtering the content based, at least in part, on the rights of the first entity.

* * * * *